US010303245B2

(12) United States Patent
Ha et al.

(10) Patent No.: US 10,303,245 B2
(45) Date of Patent: May 28, 2019

(54) METHODS AND DEVICES FOR DETECTING AND RESPONDING TO CHANGES IN EYE CONDITIONS DURING PRESENTATION OF VIDEO ON ELECTRONIC DEVICES

(71) Applicant: Adobe Inc., San Jose, CA (US)

(72) Inventors: Eric Ha, San Jose, CA (US); Dwight Rodgers, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 14/703,201

(22) Filed: May 4, 2015

(65) Prior Publication Data

US 2016/0328015 A1 Nov. 10, 2016

(51) Int. Cl.
*G09G 5/00* (2006.01)
*G06F 3/01* (2006.01)
*G06Q 30/02* (2012.01)
*G06K 9/00* (2006.01)

(52) U.S. Cl.
CPC ......... *G06F 3/013* (2013.01); *G06K 9/00597* (2013.01); *G06Q 30/02* (2013.01)

(58) Field of Classification Search
CPC .. G06Q 30/02; G06Q 30/0255; G01S 13/723; G06F 3/013; G06K 9/00597; H04N 13/042; A61B 5/14503
USPC .......... 340/425.5; 345/619, 156; 348/43, 78; 725/12, 34; 600/309; 705/14.41
See application file for complete search history.

(56) References Cited

U.S. PATENT DOCUMENTS

| 2006/0256133 | A1* | 11/2006 | Rosenberg | G06Q 30/02 345/619 |
| 2010/0253489 | A1* | 10/2010 | Cui | G01S 13/723 340/425.5 |
| 2012/0016733 | A1* | 1/2012 | Belvin | G06Q 30/02 705/14.41 |
| 2012/0133754 | A1* | 5/2012 | Lee | G06F 3/013 348/78 |
| 2014/0040948 | A1* | 2/2014 | Asai | G06Q 30/0255 725/34 |
| 2014/0282646 | A1* | 9/2014 | McCoy | G06K 9/00597 725/12 |
| 2015/0015479 | A1* | 1/2015 | Cho | G06F 3/013 345/156 |
| 2015/0065820 | A1* | 3/2015 | Ho | A61B 5/14503 600/309 |

(Continued)

*Primary Examiner* — Abdul-Samad A Adediran
(74) *Attorney, Agent, or Firm* — Kilpatrick Townsend & Stockton LLP (57) ABSTRACT

Methods and devices are disclosed herein for detecting and responding to changes in eye conditions during presentation of video on electronic devices. One embodiment involves monitoring, via an electronic tracking device, an eye of a person watching a video on an electronic device to monitor a viewing direction of the eye. The embodiment determines that the person is watching the video based on the viewing direction of the eye and detects a change in the viewing direction of the eye. In response to detecting the change in viewing direction of the eye, the embodiment determines that the person is focused on something other than the video based on additional monitoring of the eye. Presentation of the video is changed based on determining that the person is focused on something other than the video. For example, the video may be paused, discontinued, minimized, or a targeted advertisement inserted.

20 Claims, 5 Drawing Sheets

(56) References Cited

U.S. PATENT DOCUMENTS

2015/0215601 A1* 7/2015 Zhou .................. H04N 13/042
348/43

* cited by examiner

METHODS AND DEVICES FOR DETECTING AND RESPONDING TO CHANGES IN EYE CONDITIONS DURING PRESENTATION OF VIDEO ON ELECTRONIC DEVICES

TECHNICAL FIELD

This disclosure relates generally to electronic devices that present video content and devices used in, on, or with those electronic devices to detect and respond to changes in eye conditions of the person watching the video content.

BACKGROUND

Wearable devices are increasing in use and popularity. Such technology includes clothing and accessories incorporating computer and advanced electronic technologies. Some wearable devices display electronic content to persons wearing the devices. For example, electronic content can be displayed on watches, eye glass lenses, or projected from the worn electronic devices onto a nearby surface. Existing user interface components and techniques for wearable electronic devices are cumbersome, time-consuming, and otherwise inadequate.

SUMMARY

Methods and devices are disclosed herein for detecting and responding to changes in eye conditions during presentation of video on electronic devices. One embodiment involves monitoring, via an electronic tracking device, an eye of a person watching a video on an electronic device to monitor a viewing direction of the eye. The embodiment determines that the person is watching the video based on the viewing direction of the eye and detects a change in the viewing direction of the eye. In response to detecting the change in viewing direction of the eye, the embodiment determines that the person is focused on something other than the video based on additional monitoring of the eye. Presentation of the video and/or audio associated with the video is changed based on determining that the person is focused on something other than the video. For example, the video may be paused, discontinued, minimized, or a targeted advertisement inserted and/or audio associated with the video may be muted or reduced.

Methods and devices are also disclosed herein for identifying a person's interest based on changes in eye conditions during presentation of video on wearable electronic devices. One embodiment involves monitoring, via an electronic tracking device, an eye of a person watching a video on a wearable electronic device to monitor dilation of a pupil of the eye. The embodiment involves determining a level of interest based on a change in the dilation of the pupil of the eye and associating the level of interest with content displayed in the video when the change occurred. Customized content is presented on the wearable electronic device based on the level of interest associated with the content displayed in the video when the change occurred. For example, if a person's interest in automobiles is identified, an automobile advertisement may be selected and presented at the next scheduled advertisement break.

These illustrative embodiments and features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Existing user interface techniques for controlling wearable electronic devices are cumbersome, time-consuming, and otherwise inadequate, especially with respect to controlling video content. This invention addresses these issues by detecting and responding to changes in eye conditions during presentation of video on electronic devices. An electronic tracking device, such as a sensor or camera, monitors the eye to detect changes that can signal the intentions of the person watching the video. For example, the physical condition of the person's eye condition (or how the condition changes over time) may indicate that the person is focused on something other than the video, that the person's focus has returned to watching the video, that the person has fallen asleep, that the person is interested or disinterested in particular content in the video, and otherwise provide information about the person that can be used as triggers. For example, a person looking away and focusing on a distant object can trigger a pause in the presentation of the video. Similarly, when the person looks back at and focuses on the video, presentation of the video can be resumed.

A video can thus be controlled, not only without the user having to use hands or voice, but without the user having to intentionally initiate that control. In one example, the user does not have to intend the video to pause, the video pauses simply by the person looking away and focusing on something else.

The eye movement triggers and associated responses can be preconfigured or learned. For example, the devices may monitor the particular person's reactions over time, identifying that the person generally does not change the video when looking away and changing focus for less than three seconds before turning back and also identifying that the person pauses the video when looking away and changing focus for more than three seconds. Based on this learning, the person's device may be configured to pause after detections of the person looking away and changing focus for more than three seconds. A different person's device (based on observations of that person's reactions) may be configured to turn off the display of content altogether after that person looks away and changes focus for more than ten seconds. Thus, one or both of the triggers and responses can be learned based on observations of the person wearing the device. If multiple people wear the device the identity of each individual can be determined, e.g., based on user input, eye recognition, etc. The triggers and responses of each individual using the device can be customized to the individual. In another embodiment, multiple devices used by a given person may communicate person-specific learned or inputted settings. For example, if a husband picks up and uses his wife's device, the wife's device can be configured to behave exactly the same as if the husband had picked up his own device, accessing and/or utilizing all of the historical and learned behaviors from the husband's device.

A tracking device additionally or alternatively monitors the person's eye to assess the person's interest in the content being watched. In one example, the person focusing on the video and focusing on something other than the video is tracked during the video presentation to identify portions of the video in which the person was more or less interested. A person looking away from the video during the action scenes more than the person looking away from the video during dialogue scenes can be used to determined that the person is more interested in dialogue than action, that the person dislikes action or violence, etc.

In another example, the relative size of the pupil of the eye of the person is tracked. An increase in size in the pupil is used as an indicator that the person is interested in the content being presented during the pupil increase. Conversely, a decrease in size in the pupil is used as an indicator that the person is disinterested or dislikes the content being presented. The identified level of interest of the person in one or more products, services, topics, or other subject matter (i.e., how much the person favors or disfavors those things) is used to supplement the person's profile and/or present advertising or other materials (e.g., additional video using the wearable device, separate e-mail, mail, etc.) to the person.

In another example, the tear layer on the eye is monitored to detect its moisture content. A reduction in moisture content, e.g., the eye drying out, may indicate a reduction in blinking, which may suggest that the person is unwilling to blink during an intense scene. An increase in the tear layer may indicate crying or other state of interest or emotion triggered by the displayed content.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

As used herein, the phrase "electronic device" refers to any electrically-powered device. Examples of electronic devices include wearable electronic devices, handheld electronic devices, such as smart phones and tablets, and larger electronic devices, such as laptop and desktop computers and televisions.

As used herein, the phrase "wearable electronic device" refers to any electrically powered device that can be temporarily or permanently secured to a person. Examples of wearable electronic devices include, but are not limited to, eyeglasses containing electronics, hats and clothing containing electronics, watches, wristbands, armbands, etc.

As used herein, the phrase "video" refers to any electronic content that includes multiple images presented over time. Video can, but need not, include audio. Examples of videos include, but are not limited to, movies, shows recorded for television, shows or content recorded by a camera over time, animated cartoons, electronic content with moving or non-static items (such as content created for playback on Adobe® Flash® Player, etc.), and electronic slideshows.

As used herein, the phrase "focus" refers to the condition of a person's eye viewing an object at a particular distance clearly, otherwise known as the focal plane. As examples, a person's eye may be focused to clearly see a video displayed up close, e.g., on a lens of eyeglasses on the person's head, may be focused to clearly see a face of a person standing a few feet away, or may be focused to clearly see a distant mountain peak. When a person's focus changes, the size and/or shape of a lens within the person's eye generally changes to allow the person to clearly see one or more objects of interest based on the distance of the object(s) from the person.

As used herein, the phrase "eyeglasses" refers to frames bearing one or more lenses worn in front of the eyes. The lenses may, but need not, improve the person's vision. The lenses may, but need not, provide sun or brightness protection.

Figure 1:
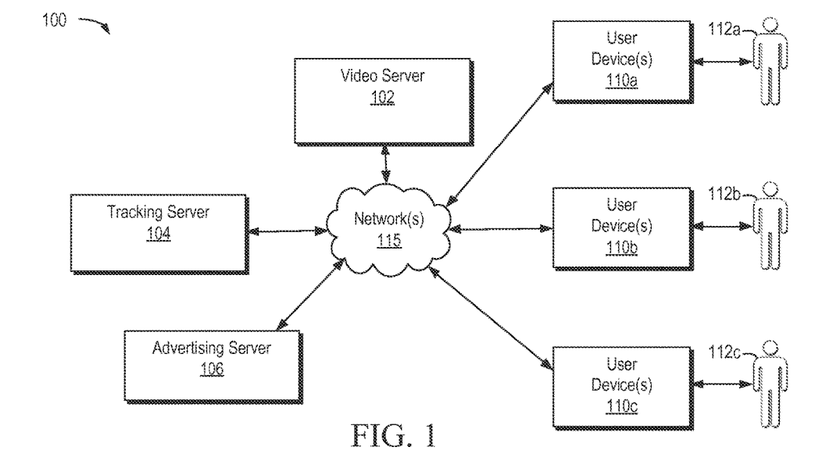
FIG. 1 is a block diagram depicting an example of a system employing devices for detecting and responding to changes in eye conditions during presentation of video.

Referring now to the drawings, FIG. 1 is a block diagram depicting an example of a system employing devices for detecting and responding to changes in eye conditions during presentation of video. In this example, video server 102 provides video for presentation on user devices 110*a-c* to persons 112*a-c*, respectively, through server 115. Video content can be streamed or downloaded to the user devices 110*a-c*. In an alternative embodiment, videos are provided to the user devices 110*a-c* locally rather than from a remote server.

The user devices 110*a-c* detect and respond to changes in eye conditions of persons 112*a-c* during presentation of the videos on user devices 110*a-c*. Information about changes in the eye conditions of persons 110*a-c* is used to control the presentation of videos on user devices 112*a-c* and/or is provided to tracking server 104. Tracking server 104 maintains profiles for persons 112*a-c*. In one embodiment, the user devices 110*a-c* include computer instructions to determine responses to the changes in eye conditions. In an alternative embodiment, tracking server 104 includes computer instructions to remotely determine responses to the changes in eye conditions. For example, tracking server 104 may identify an interest in a particular product based on person 112*a*'s eye condition changing and, in response, instruct advertising server 106 to provide an advertisement about the product to user device 110*a* for presentation to person 112*a*.

In another example, the management server 102 provides a custodian-specific user interface that provides custodian specific tools. Exemplary tools identify electronic contracts that are coming due for review, identify electronic contracts coming due for expungement according to an expungement policy, identify new contracts, identify custodian events for individual contracts that have been performed, and identify electronic contracts designations or classifications, e.g., contracts designated for special scrutiny.

Figure 2:
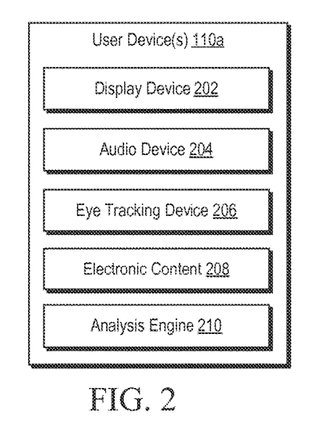
FIG. 2 is a block diagram illustrating exemplary modules for a user device of FIG. 1.

FIG. 2 is a block diagram illustrating exemplary modules for implementing functions in user device 110a of FIG. 1. User device 110a includes modules 202, 204, 206, 208, 210. Each module may include one or more devices or components configured to provide one or more functions. In additional or alternative embodiments, these modules may be provided in separate, communicatively-coupled devices. For example, the display device 202 may be separated from the eye tracking device, and both may be separated from the analysis engine 210.

Module 202 is a display device, such as an LED, LCD, plasma, projector, or light display configured to display video.

Module 204 is an audio device such as a speaker configured to produce sound associated with the displayed portion of the video.

Eye tracking device 206 is configured to track (or capture/record information used to identify) one or more conditions of an eye, including but not limited to, a direction in which the eye is looking, how open the eye lid is, how tired the eye is, how dilated the pupil of the eye is, attributes of the size and/shape of a lens within the eye, or any other measurable attribute of the eye. The eye tracking device may comprise a camera, a sensor, a device for bouncing light or sound waves off of eye structures, or any other tracking component capable of measuring an attribute of the eye. Eye tracking device may include an eye recognition component for recognizing a person using user device 110a based on distinguishing characteristics of the eye, such as eye color, eye size, eye pattern, eyelid physical characteristics, etc.

Module 208 on user device 110a caches or stores electronic content for presentation on the user device 110a. Examples of electronic content stored in module 208 include, but are not limited to, videos, advertisements, games, and software applications.

Module 210 provides an analysis engine configured to analyze information about the condition of the eye of the person 112a (or other users of the device 110a) to determine and/or provide an appropriate response. For example, module 210 may recognize, based on captured images of the eye, that the pupil of the eye has dilated during a portion of a political candidate's speech relating to the economy and, based on that recognition, present a political advertisement relating to economic issues during an upcoming commercial break.

Figure 3:
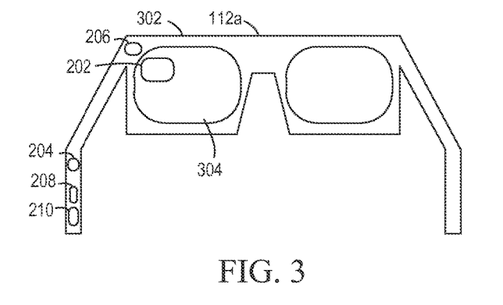
FIG. 3 depicts eyeglasses comprising components used for detecting and responding to changes in eye conditions during presentation of video on wearable electronic devices.

FIG. 3 depicts eyeglasses comprising components used for detecting and responding to changes in eye conditions during presentation of video on wearable electronic devices. In this example, display module 202 is embedded in a lens portion and audio module 204 is embedded in an ear-portion of the frame. Eye tracking device 206 is positioned on the frame in a location that allows it to capture or sense the condition of the eye that is watching the display device 202. In an alternative embodiment, multiple eye tracking devices are positioned on the frame along the perimeter of the frame 302 around lens 304 so that conditions of the eye can be captured, sensed, and/or measured from different vantage points.

In FIG. 3, the eyeglasses also include a storage medium 208 storing the electronic content and an analysis engine 210 (a processor executing stored instructions) embedded within the frame 302 of the eyeglasses. The modules 202, 204, 206, 208, 210 depicted in the example of FIG. 1 can be positioned, embedded, secured, or otherwise used in various other configurations and may be communicatively-coupled to one another and/or coupled to a power source (not shown), by any appropriate connection type. Communication may be through wires or through wireless signals.

In one embodiment, one or more of modules 202, 204, 206, 208, 210 are entirely or partially implemented on a smartphone, tablet, or other electronic device carried, worn, or used by person 110a. For example, a smart phone may store a video that is streamed and displayed on the eyeglasses of FIG. 3. The smart phone may also include an analysis engine 210 that receives eye condition information e.g., images or data) from the eyeglasses and determines an appropriate response, for example, by communicating with tracking server 104 for an advertisement selection and with advertising server 106 to receive a selected advertisement. The selected advertisement may be provided on the smart phone and/or on the eyeglasses.

Figure 4:
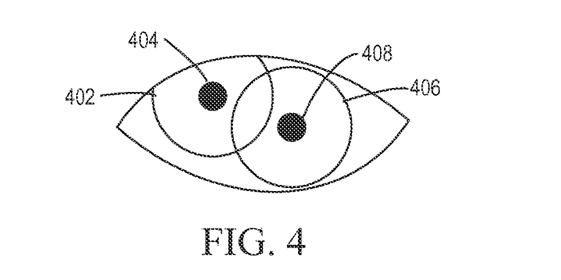
FIG. 4 depicts an example of an eye movement.

FIG. 4 depicts an example of an eye movement. In this example, the eye rotates from position 402 to position 406. Such a movement can be detected based on a camera or sensor capturing image information used to identify the location of the eye, for example, identifying a location of the pupil 404 before the movement and of the pupil 408 after the movement. The distance of movement of the eye may be determined in one embodiment based on the distance that the center of the pupil moves. Using the center of the pupil as the basis for determining movement can provide a more accurate estimate of eye movement distance in certain circumstances than other techniques, for example, where the eye dilates as it moves. Movement of the eye can be used as an indicator that the person is looking in a different direction. In one example, a threshold distance is used to determine whether the person is looking in a different direction away from a displayed video. If the eye moves a distance that is greater than the threshold, then the system can identify that the person is looking at something other than the video. The distance can be determined based on the size of the displayed content and its proximity to the person's eye. The threshold is set and/or adjusted by the person in one embodiment.

Figure 5A:
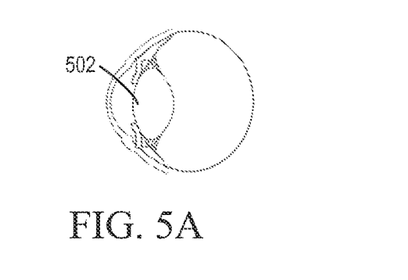
FIG. 5A depicts an example eye lens size and shape.
Figure 5B:
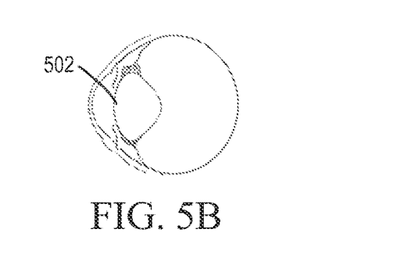
FIG. 5B depicts an example of a change in the eye lens size and shape of FIG. 5A.

FIGS. 5a-b depict an example of change in eye lens size and shape. In this example, the lens 502 changes shape between the figures. Such a change in shape can be detected using a camera or sensor. In one example, the eye tracking device bounces a signal off of the interior of the eye, measures the response, and identifies an attribute of the size or shape of the lens 502 based on the response that is received.

Figure 6A:
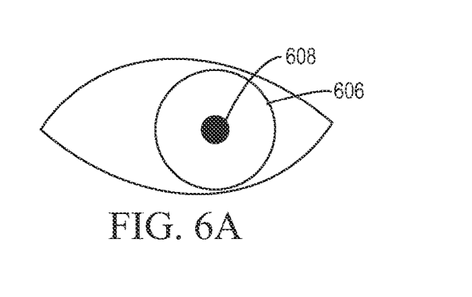
FIG. 6A depicts an example pupil dilation of an eye.
Figure 6B:
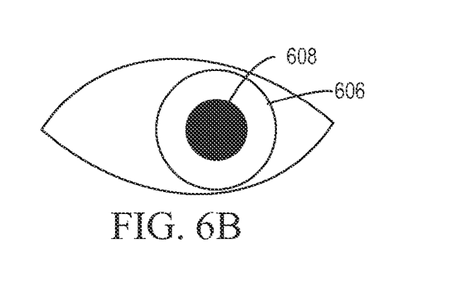
FIG. 6B depicts an example of a change in the pupil dilation of the eye of FIG. 6A.

FIG. 6 depicts an example of a change in pupil dilation of an eye. In this example, the size of the pupil 608 within iris 606 enlarges as the eye dilates. Such a change in pupil size can be detected using a camera or sensor.

Figure 7:
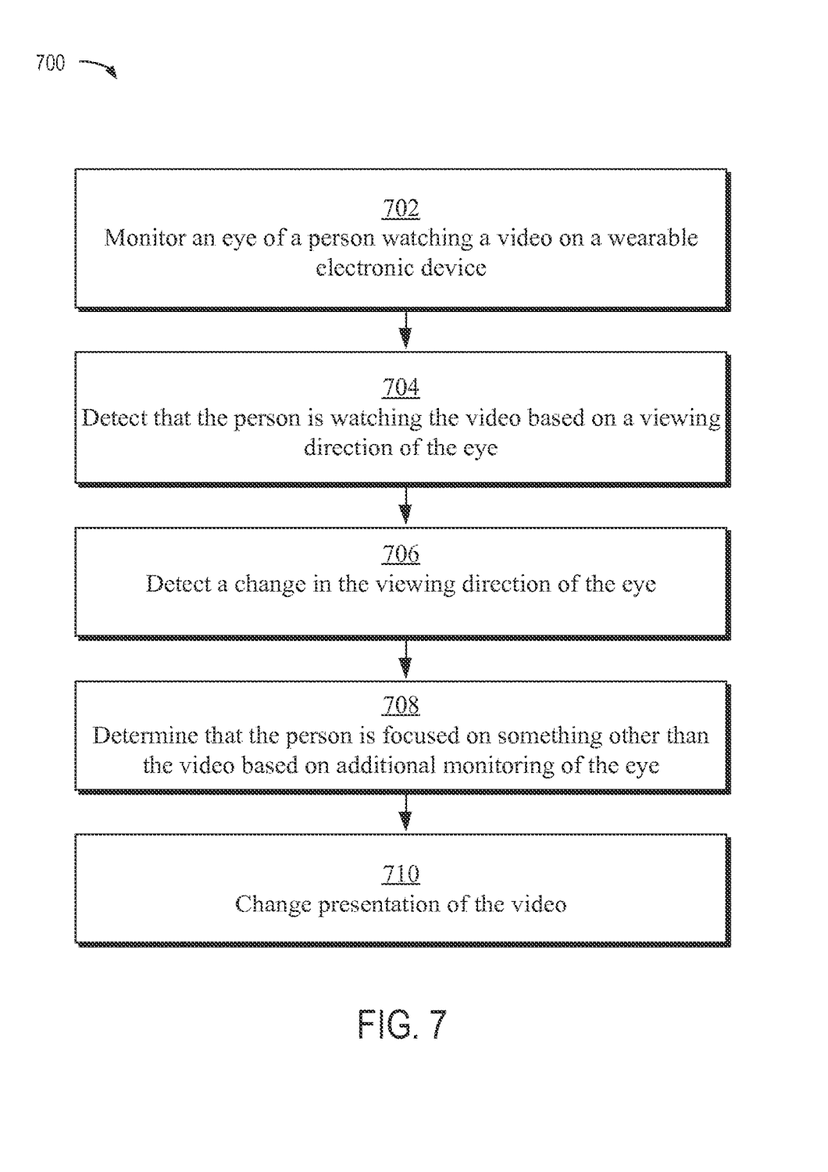
FIG. 7 is a flow chart of an exemplary method for detecting and responding to changes in eye conditions during presentation of video on electronic devices.

FIG. 7 is a flow chart of an exemplary method for detecting and responding to changes in eye conditions during presentation of video on electronic devices. Method 700 can be performed by one or more of the devices of FIG. 1 or any other suitable devices.

The method 700 involves monitoring an eye of a person watching a video on a wearable electronic device to monitor a viewing direction of the eye, as shown in block 702.

The method 700 further involves determining that the person is watching the video based on the viewing direction of the eye, as shown in block 704. This can be determined based on an expected position of a center of the pupil and/or iris given a location of the displayed video relative to the person's head. For example, if the video is displayed on a left portion of an eyeglasses lens worn by the person, the center of the person's pupil/iris can be expected to be oriented in that direction.

The method 700 further involves detecting a change in the viewing direction of the eye, as shown in block 706. This can be detected, for example, based on a camera or sensor capturing image information and identifying a location of the pupil before the movement and of the pupil after the movement.

The method 700 also involves determining that the person is focused on something other than the video based on additional monitoring of the eye, as shown in block 708. This may be done in response to detecting the change in viewing direction of the eye. Determining that the person is focused on something other than the video may be based on determining that the person's focal plane has changed, for example, based on detecting a change in the size and/or shape of a lens within the person's eye. In another example, the additional monitoring of the eye involves detecting that the viewing direction is constant in a direction away from the video for at least a threshold amount of time.

Determining that the person is focused on something other than the video may additionally or alternatively be based on a detection of a change of movement of a head of the person, a sound of a voice of a particular person, an ambient noise, or the eye closing for a length of time longer than a blink threshold.

In one embodiment, determining that the person is focused on something other than the video is additionally or alternatively based on a learned, person-specific threshold for the person. In one example, the learned, person-specific threshold is determined based on prior eye condition change of the person and prior intentional action by the person determined to be associated with the prior eye condition change based on prior observations. For example, a 5 second threshold may have been identified based on observing that the person previously tended to stop the content in circumstances in which the person focused on something other than the content for more than 5 seconds, but did not stop or rewind the content in circumstances in which he or she focused on something other than the content for less than 5 seconds.

In block 710, the method involves changing presentation of the video, as shown in block 710. This can be based on determining that the person is focused on something other than the video. Changing the presentation can involve one or more of displaying the video in a smaller size display area, pausing the video, removing the video from being displayed, or reducing volume of audio associated with the video, among other things.

After changing presentation of the video, e.g., by pausing the video, a subsequent eye condition change may undo to change in the presentation of the video. In one example, this involves detecting a second change in the viewing direction of the eye, determining that the person has resumed focusing on the video, and based on determining the person has resumed focusing on the video, changing the presentation of the video back to its prior state.

The monitoring of the eye can further involve tracking pupil dilation while the person is focused on the video, determining a level of interest based on pupil dilation, associating the level of interest with content displayed in video, and presenting an advertisement selected based on the level of interest and content displayed in the video, or updating a profile of the person based on the level of interest and the content displayed in the video.

The monitoring of the eye can also facilitate replaying of content that the person may have missed while looking away from the video. In one example, a user plays a video on a wearable electronic device without focusing on the video, i.e., the video is played in the background. If something catches the person's attention such that the person focuses on the video, the video may automatically backup to allow the person to observe the eye-catching content. This process can involve determining that the person has focused on the video, identifying that the person was interested in the content just presented in the video based on determining that the person focused on the video, and replaying the content that was just presented in the video.

The monitoring of the eye can also involve determining comfort of the eye, detecting ambient light, and adjusting the brightness of the presentation of the video based on the determined comfort of the eye and detected ambient light. For example, if the person is squinting, the brightness of the display may be reduced.

In addition to monitoring the eye, the tracking device may monitor external conditions. In one example, the device monitors the person's surroundings. A sensor detecting objects near the person may determine that a collision has occurred or is about to occur and the video presentation may be changed in response. In one example, this prevents a person from walking into a detected pole by stopping display of the video prior to the person colliding with the pole.

Figure 8:
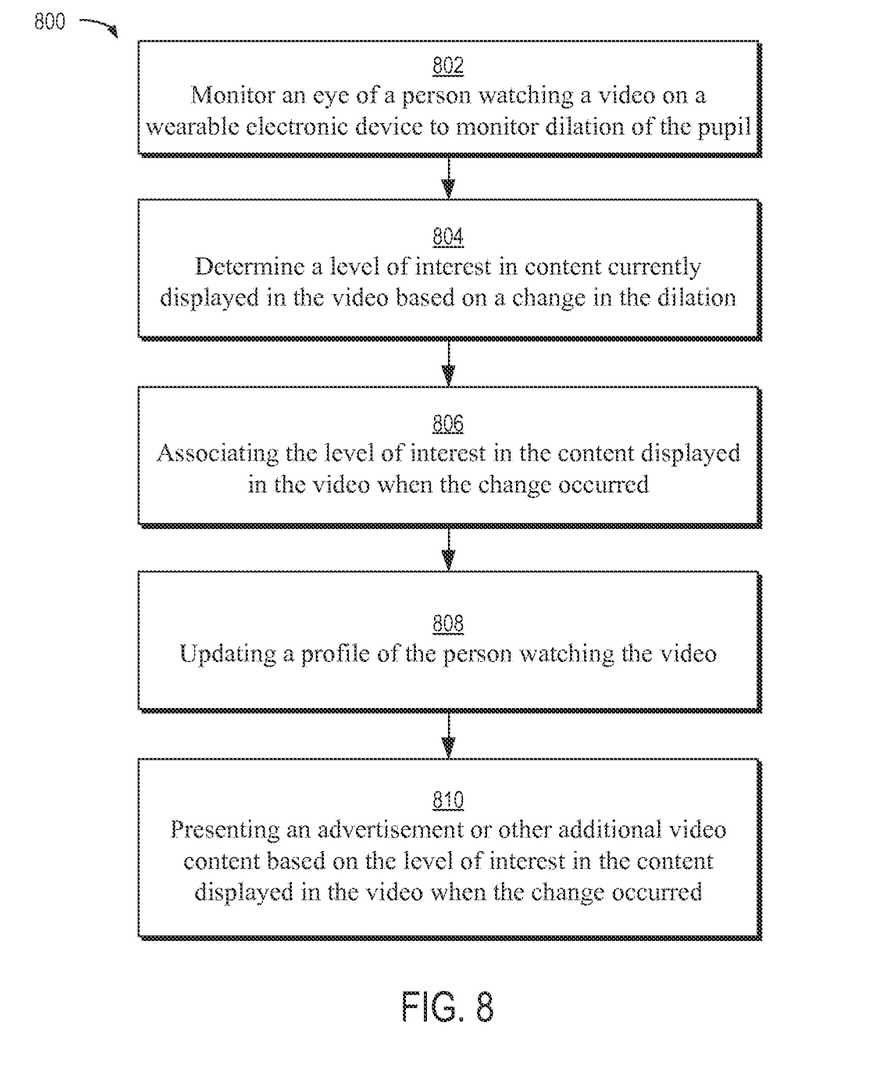
FIG. 8 is a flow chart of an exemplary method for identifying a person's interest or disinterest based on changes in eye conditions during presentation of video on electronic devices.

FIG. 8 is a flow chart of an exemplary method for identifying a person's interest based on changes in eye conditions during presentation of video on electronic devices. Method 800 can be performed by one or more of the devices of FIG. 1 or any other suitable devices.

Method 800 involves monitoring, via an electronic tracking device, an eye of a person watching a video on a wearable electronic device to monitor dilation of a pupil of the eye, as shown in block 802.

Method 800 further involves determining a level of interest based on a change in the dilation of the pupil of the eye, as shown in block 804. For example, an increase in the size of the pupil may be identified as an indication of a high level of interest in a product or service displayed in the video. A decrease in a size of the pupil may conversely indicate a disinterest or dislike in a product or service displayed in the video. Additional eye condition information, e.g., eye opening more or less, squinting, etc., may additionally or alternatively be used as an indicator of interest or disinterest in the content being displayed.

Method 800 further involves associating the level of interest with content displayed in the video when the change occurred, as shown in block 806. The relative interest of the person in different attributes of a product, a service, or a performance presented in the video is determined in one embodiment based on changes in the dilation of the pupil of the eye during presentation of the video.

Method 800 further involves customizing presentation of content on the wearable electronic device based on the level of interest, as shown in block 808. For example, this can involve providing advertising content to the person based on an identified high level of interest in a particular product, person, or topic.

Method 800 may further involve updating a profile of the person based on associating the level of interest in content displayed in the video when the change occurred. Over time a consumer profile of the individual may be developed to facilitate targeted advertising. Such data collection and advertising, in one embodiment, keeps the identity of the person anonymous.

Exemplary Computing Environment

Figure 9:
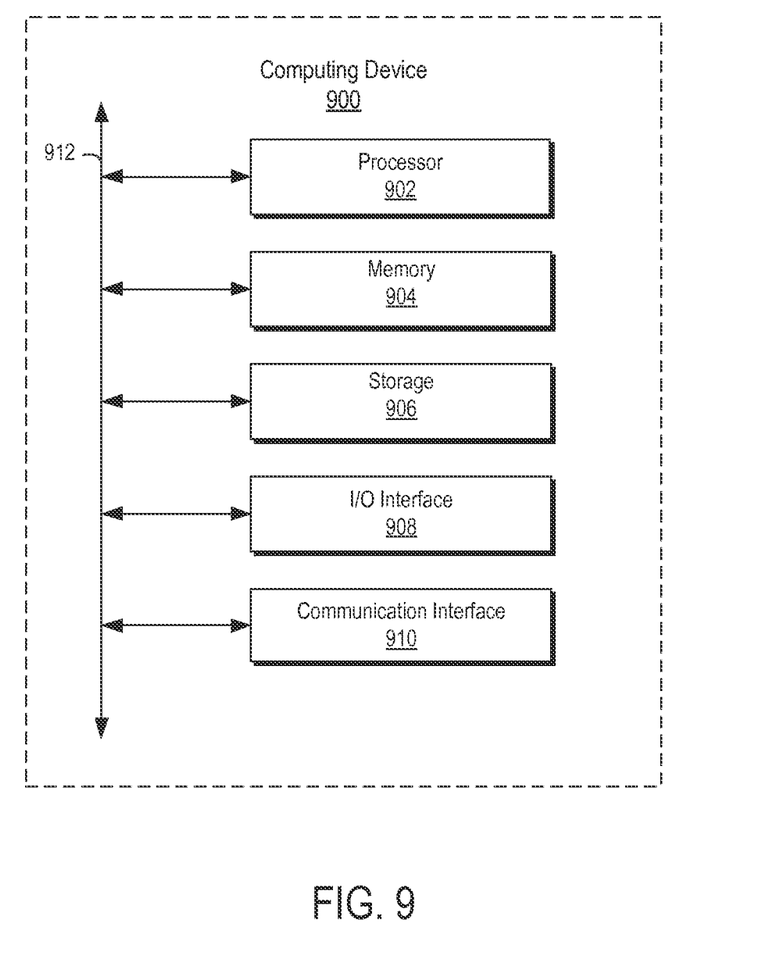
FIG. 9 is a block diagram depicting example hardware implementations for the components described in FIG. 1.

Any suitable computing system or group of computing systems can be used to implement the computer devices 102, 104, 110a-c of FIG. 1 or otherwise used to implement the techniques and methods disclosed herein. For example, FIG. 9 is a block diagram depicting examples of implementations of such components. The computing device 900 can include a processor 902 that is communicatively coupled to a memory 904 and that executes computer-executable program code and/or accesses information stored in the memory 904 or storage 906. The processor 902 may comprise a microprocessor, an application-specific integrated circuit ("ASIC"), a state machine, or other processing device. The processor 902 can include one processing device or more than one processing device. Such a processor can include or may be in communication with a computer-readable medium storing instructions that, when executed by the processor 902, cause the processor to perform the operations described herein.

The memory 904 and storage 906 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 may also comprise a number of external or internal devices such as input or output devices. For example, the computing device is shown with an input/output ("I/O") interface 808 that can receive input from input devices or provide output to output devices. A communication interface 910 may also be included in the computing device 900 and can include any device or group of devices suitable for establishing a wired or wireless data connection to one or more data networks. Non-limiting examples of the communication interface 910 include an Ethernet network adapter, a modem, and/or the like. The computing device 900 can transmit messages as electronic or optical signals via the communication interface 910. A bus 912 can also be included to communicatively couple one or more components of the computing device 900.

The computing device 900 can execute program code that configures the processor 902 to perform one or more of the operations described above. The program code can include one or more of the modules of FIG. 2. The program code may be resident in the memory 804, storage 806, or any suitable computer-readable medium and may be executed by the processor 902 or any other suitable processor. In some embodiments, modules can be resident in the memory 904. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   monitoring, via an electronic tracking device of a wearable electronic device, an eye of a person watching a video presented on a display component of the wearable electronic device to monitor a viewing direction of the eye;
   determining, by an analysis engine configured to analyze information about a trigger condition of the eye of the person and to determine an appropriate response, the analysis engine including a device or component communicatively coupled to the electronic tracking device, that the person is watching the video based on the viewing direction of the eye;

detecting, by the electronic tracking device, an eye movement indicating a change in the viewing direction of the eye;

determining, by the analysis engine and responsive to detecting the eye movement, that the person is focused on something other than the video based on determining a change in a focal plane of the eye;

monitoring, by the analysis engine, the eye movement of the eye subsequent to determining that the person is focused on something other than the video;

determining, by the analysis engine:
  that the eye movement is one of multiple learned trigger conditions, and
  a learned response associated with the learned trigger condition,
  wherein the multiple learned trigger conditions and the learned response are based on observations of:
    (i) a prior eye movement of the person, and
    (ii) a prior intentional action other than the prior eye movement and performed by the person to modify presentation of the video; and performing the learned response to modify presentation of the video or audio associated with the video on the wearable electronic device based on the learned trigger condition having been performed.

2. The method of claim 1, wherein determining the change in the focal plane of the eye comprises detecting a change in a size and shape of a lens in the eye.

3. The method of claim 1, wherein the monitoring of the eye comprises detecting that the viewing direction is constant in a direction away from the video for at least a threshold amount of time.

4. The method of claim 1, further comprising:
detecting, by the electronic tracking device, a second eye movement indicating a second change in the viewing direction of the eye;
determining, by the analysis engine and responsive to detecting the second eye movement, that the person has resumed focusing on the video based on determining a second change in the focal plane of the eye;
based on determining the person has resumed focusing on the video, resuming, by the analysis engine, the presentation of the video back to content presented prior to the eye movement.

5. The method of claim 1, wherein modifying the presentation of the video or audio associated with the video further comprises one or more of: displaying the video in a smaller size display area, pausing the video, removing the video from being displayed, or reducing volume of the audio associated with the video.

6. The method of claim 1 further comprising:
tracking, via the electronic tracking device, pupil dilation while the person is focused on the video;
determining, by the analysis engine, a level of interest based on pupil dilation;
associating, by the analysis engine, the level of interest with content displayed in video;
presenting, by the analysis engine, an advertisement selected based on the level of interest and content displayed in the video, or updating a profile of the person based on the level of interest and the content displayed in the video; and
wherein modifying the presentation of the video on the electronic device includes stopping presentation of the advertisement.

7. The method of claim 1 wherein the wearable electronic device is eyeglasses, wherein the electronic tracking device is part of or secured to the eyeglasses.

8. The method of claim 1, wherein determining that the person is focused on something other than the video is further based on a detection of:
a sound of a voice of a particular person detected by the electronic tracking device; and
ambient noise detected by the electronic tracking device.

9. The method of claim 8, wherein determining that the person is focused on something other than the video is further based on a detection of:
a change of movement of a head of the person detected by the electronic tracking device; and
the eye closing for a length of time longer than a blink threshold, as detected by the electronic tracking device.

10. The method of claim 1 further comprising:
determining, by the analysis engine, comfort of the eye;
detecting, by the electronic tracking device, ambient light; and
adjusting, by the analysis engine, brightness of presentation of the video based on the determined comfort of the eye and detected ambient light.

11. The method of claim 1, further comprising:
while the presented video is played without the person focusing on the video, determining, by the electronic tracking device, that the person has focused on the video;
identifying, by the analysis engine, that the person was interested in played content just presented in the video based on the determination that the person has focused on the video; and
replaying the content that was presented in the video when the person has focused on the video.

12. The method of claim 1, further comprising:
the monitoring further comprising monitoring, via the electronic tracking device, a tear layer of the eye of the person watching the video, the tear layer of the eye corresponding to a moisture content level proximate to the eye;
the determining further comprising determining, by the analysis engine, a level of interest based on a change in the tear layer of the eye as detected by the electronic tracking device;
associating, by the analysis engine, the level of interest with content displayed in the video when the change occurred; and
customizing, by the analysis engine, a presentation of further content on the wearable electronic device based on the level of interest.

13. The method of claim 12, further comprising:
monitoring, by the electronic tracking device, a change in dilation of a pupil of the eye;
identifying, by the analysis engine, that an increase in a size of the pupil indicates a high level of interest in a product or service displayed in the video; and
providing advertising content to the person based on the identified high level of interest, the advertising content relating to the product or service.

14. The method of claim 12, further comprising:
monitoring, by the electronic tracking device, a change in dilation of a pupil of the eye; and
identifying, by the analysis engine, that a decrease in a size of the pupil indicates a disinterest or dislike in a product or service displayed in the video.

15. The method of claim 14 further comprising identifying, by the analysis engine, squinting of the eye as an additional indicator of disinterest or dislike.

16. The method of claim 12 further comprising updating, by the analysis engine, a profile of the person based on the level of interest in content displayed in the video when the change occurred.

17. The method of claim 12 further comprising determining, by the analysis engine, relative interest of the person in different attributes of a product, a service, or a performance presented in the video based on changes in the tear layer or changes in dilation of a pupil of the eye during presentation of the video.

18. A wearable electronic device comprising:
a processor;
a non-transitory computer readable medium that, when executed by the processor, performs operations comprising:
   presenting video on a display component of a wearable electronic device;
   monitoring a viewing direction of an eye of a person watching the video on the display component of the wearable electronic device, wherein the monitoring uses information from a camera or sensor that moves with a head of the person such that the camera or sensor remains in a fixed position relative to the eye as the head moves;
   determining that the person is watching the video based on the viewing direction of the eye;
   detecting, based on the information from the camera or sensor, an eye movement indicating a change in the viewing direction of the eye;
   determining, responsive to detecting the eye movement, that the person is focused on something other than the video based on determining a change in a focal plane of the eye;
   monitoring the eye movement of the eye subsequent to determining that the person is focused on something other than the video;
   determining:
      that the eye movement is one of multiple learned trigger conditions, and
      a learned response associated with the learned trigger condition,
      wherein the multiple learned trigger conditions and the learned response are based on observations of:
         (i) a prior eye movement of the person, and
         (ii) a prior intentional action other than the prior eye movement and performed by the person to modify presentation of the video; and
   performing the learned response to modify presentation of the video on the display component or audio associated with the video on the wearable electronic device based on the learned trigger condition having been performed.

19. The wearable electronic device of claim 18, wherein determining that the person is focused on something other than the video is further based on a detection of:
a change of movement of a head of the person detected by the electronic tracking device;
a sound of a voice of a particular person detected by the electronic tracking device;
ambient noise detected by the electronic tracking device; and
the eye closing for a length of time longer than a blink threshold, as detected by the electronic tracking device.

20. A method comprising:
monitoring, via an electronic tracking device of a wearable electronic device, an eye of a person watching a video presented on a display component of the wearable electronic device to monitor a viewing direction of the eye;
determining, by an analysis engine configured to analyze information about a trigger condition of the eye of the person and to determine an appropriate response, the analysis engine including a device or component communicatively coupled to the electronic tracking device, that the person is watching the video based on the viewing direction of the eye;
detecting, by the electronic tracking device, an eye movement indicating a change in viewing direction of the eye;
determining, by the analysis engine and responsive to detecting the eye movement, that the person is focused on something other than the video based on determining a change in a focal plane of the eye;
determining, by the analysis engine, that the person has intentionally performed an action other than the eye movement, the action determined, based on prior observations, to be associated with the change in focal plane, wherein the action is performed by the person to modify presentation of the video;
determining, by the analysis engine, that the eye movement is a learned trigger condition and that the action is a learned response associated with the learned trigger condition; and
determining the learned trigger condition and the learned response based on (i) the change in focal plane, and (ii) the intentional action.

* * * * *